United States Patent
Pahle et al.

(10) Patent No.: US 8,960,383 B2
(45) Date of Patent: Feb. 24, 2015

(54) BRAKE DISC COVER FOR A BRAKE DISC OF A DISC BRAKE

(75) Inventors: Wolfgang Pahle, Bad Wiessee (DE); Michael Schubert, Munich (DE); Holger Lathwesen, Heigenhausen (DE); Josef Sameter, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 191 days.

(21) Appl. No.: 12/941,573

(22) Filed: Nov. 8, 2010

(65) Prior Publication Data

US 2011/0108379 A1    May 12, 2011

Related U.S. Application Data

(63) Continuation of application No. PCT/EP2009/003232, filed on May 6, 2009.

(30) Foreign Application Priority Data

May 9, 2008   (DE) .......................... 10 2008 022 967

(51) Int. Cl.
  *F16D 65/00*    (2006.01)
(52) U.S. Cl.
  USPC ................... 188/218 A; 188/264 W
(58) Field of Classification Search
  CPC ... F16D 65/00; F16D 65/847; F16D 65/0025; F16D 2055/0037; F16D 55/22
  USPC ........ 188/218 A, 264 W, 71.1, 71.6, 218 XL, 188/264 R, 264 A, 264 AA
  See application file for complete search history.

(56) References Cited

U.S. PATENT DOCUMENTS

| | | |
|---|---|---|
| 2,371,158 A | 3/1945 | Eby |
| 4,155,601 A | 5/1979 | Ito |
| 4,257,498 A | 3/1981 | Nogami |

(Continued)

FOREIGN PATENT DOCUMENTS

| | | |
|---|---|---|
| DE | 36 34 490 A1 | 4/1988 |
| DE | 101 55 645 A1 | 5/2003 |

(Continued)

OTHER PUBLICATIONS

German Office Action dated Mar. 2, 2009 including partial English-language translation (Fourteen (14) pages).

(Continued)

*Primary Examiner* — Xuan Lan Nguyen
(74) *Attorney, Agent, or Firm* — Crowell & Moring LLP

(57) ABSTRACT

A brake disc cover for a brake disc of a disc brake is provided, which is disposed on a component of a vehicle that is rotationally fixed during travel and which encloses at least one section of a circumferential edge of the brake disc preferably in a trough-like fashion. Two side wall areas are located on axial side sections of the brake disc to be covered that are directly opposite each other, wherein the side wall areas cover at least a partial area of the axial sides of the brake disc. A base wall area connects the side wall areas, which base wall area covers the circumferential edge of the brake disc. The side wall areas are oriented at an angle to each other such that the distance between the two side wall areas decreases radially from the inner circumferential edge of the brake disc cover. The brake disc cover has a surface contour that does not follow mathematical symmetry.

18 Claims, 3 Drawing Sheets

(56) References Cited

U.S. PATENT DOCUMENTS

| | | | |
|---|---|---|---|
| 5,671,827 A * | 9/1997 | Demetriou et al. | 188/71.6 |
| 5,735,370 A | 4/1998 | Nitta et al. | |
| 7,341,130 B2 | 3/2008 | Samuelsson | |
| 2005/0126868 A1 | 6/2005 | Lee | |
| 2006/0049004 A1* | 3/2006 | Samuelsson | 188/71.1 |
| 2008/0053762 A1 | 3/2008 | Nakamura et al. | |

FOREIGN PATENT DOCUMENTS

| | | |
|---|---|---|
| DE | 103 48 001 A1 | 5/2005 |
| EP | 0 786 606 A2 | 7/1997 |
| EP | 1 191 245 A2 | 3/2002 |
| EP | 1 577 578 B1 | 9/2005 |
| JP | 6-227471 A | 8/1994 |
| JP | 11-51096 A | 2/1999 |
| MX | PA05012473 A | 7/2006 |
| SE | 523 603 C2 | 5/2004 |

OTHER PUBLICATIONS

International Search Report dated Jul. 16, 2009 including English-language translation (Ten (10) pages).

\* cited by examiner

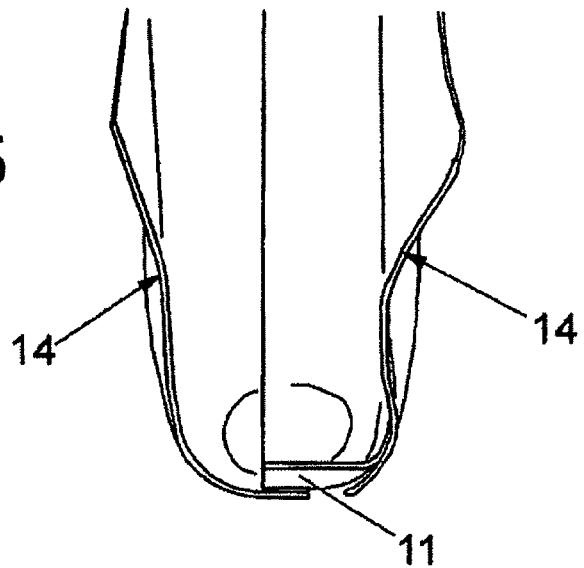
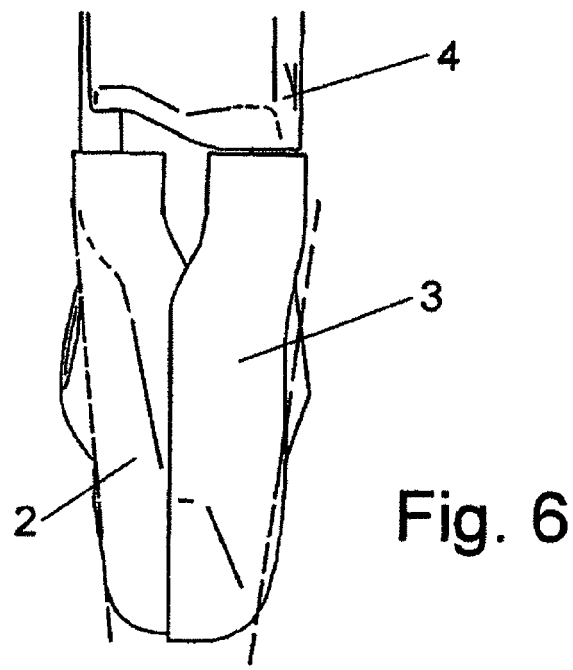

BRAKE DISC COVER FOR A BRAKE DISC OF A DISC BRAKE

CROSS REFERENCE TO RELATED APPLICATIONS

This application is a continuation of PCT International Application No. PCT/EP2009/003232, filed May 6, 2009, which claims priority under 35 U.S.C. §119 from German Patent Application No. DE 10 2008 022 967.9, filed May 9, 2008, the entire disclosures of which are herein expressly incorporated by reference.

BACKGROUND AND SUMMARY OF THE INVENTION

The invention relates to a brake disc cover for a brake disc of a disc brake. More particularly, it relates to a brake disc cover, which is disposed on a component of a vehicle that is rotationally fixed during travel and which encloses a peripheral edge of the brake disc with a radius at least sectionwise, preferably in a trough-like fashion.

Brake disc covers of this kind are known per se from the prior art. To this extent, reference is made to DE 101 55 645 A1, DE 103 48 001 A1 and EP 1 191 245 A2. However, such covers have a number of deficiencies, and these deficiencies should be eliminated. EP 1 577 578 B1, SE 523 603 C2 and MX PA05012473 A disclose additional prior art. The brake disc cover shown in the last-mentioned publication has protective covering areas on both axial sides of the brake disc.

One area of general improvement is with respect to the vibration behavior of known brake disc covers. A first aspect of the invention is directed toward solving this problem.

According to the invention, a number of solutions are provided, each of which should be regarded as inventions in their own right and which furthermore have particularly advantageous vibration behavior in combination, the tendency for severe resonant vibrations when traveling being particularly small, especially since the first natural frequencies lie in a relatively high frequency range owing to the embodiment selected.

In one embodiment, the two side wall areas are provided on axial side sections directly opposite one another of the brake disc to be covered. The two side wall areas cover at least a partial area of the axial sides of the brake disc. A base wall area is provided, which connects these lateral wall areas and covers the peripheral edge of the brake disc, the side wall areas being oriented at an angle to each other in such a way that the distance between these two side wall areas decreases radially from the inner peripheral edge of the side wall area to the outer peripheral edge of the brake disc cover.

This embodiment counteracts disadvantageous resonance effects in a simple manner.

As an option or as an alternative, the brake disc cover has a surface contour that does not follow mathematical symmetry and/or that has at least one non-planar side wall area curved in upon itself. This measure, too, counteracts disadvantageous resonance effects in a simple manner.

Another embodiment of the invention that counteracts disadvantageous resonance effects resides in the fact that the outer and/or the inner peripheral contour of the brake disc cover is designed so as not to have the shape of a partial circle, but rather to deviate from the contour of a partial circle, at least sectionwise. This embodiment also contributes to a construction which is optimized in terms of weight. The outer and/or the inner peripheral contour is preferably of partially oval or partially elliptical configuration. It is furthermore expedient here if the outer and/or the inner radius of the brake disc cover is at its maximum in the areas in which it is fixed to the component fixed to the axle and, starting from this maximum value, decreases toward a minimum with increasing distance from these areas.

Apart from this and in addition, the aim is to configure the construction of the brake disc cover and its attachment to the component fixed to the axle in a way which is as advantageous as possible.

It is the object of a further, separate invention to solve this problem, although it is also possible to combine this solution with the previously proposed solutions to give a particularly advantageous disc brake with a number of advantages.

Thus, it is proposed that the brake disc cover be of two- or multi-part construction, with at least one dirt labyrinth arrangement being formed in the brake disc cover by means of overlapping wall sections. The dirt labyrinth, which is of particularly simple construction and particularly simple to implement, effectively prevents the ingress of dirt into the area of the brake disc and optimizes cooling.

According to another option, the brake disc cover is fixed to the component fixed to the axle, in particular the brake carrier, by fixing devices oriented at an angle to each other, optimizing the strength of the arrangement in a simple manner.

The fixing devices oriented at an angle to each other are preferably designed in a simple manner as screws. If countersunk head screws are used, it is possible to screw them in such a way that they do not project above the surface of the brake disc cover, this being particularly advantageous in view of the restricted installation conditions.

It is particularly advantageous if the screws are oriented at right angles to each other. In this way, reinforcement of the brake disc cover is achieved in a simple manner.

It is particularly preferred if, in each case, at least two of the screws are oriented radially and two of the screws are oriented axially relative to the brake disc axis. It has proven expedient here if the brake disc cover is of two-part configuration and if one of the brake disc parts is fixed to the component fixed to the axle only by radially oriented screws and the other brake disc part is fixed to the component fixed to the axle only by axially oriented screws. As a supplementary measure, a reinforcing and therefore expedient effect is achieved if the brake disc parts are connected, in particular welded, to each other sectionwise.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 is another sectional view through a partial area of the brake disc cover in FIG. 1; and FIG. 6 is a view of the arrangement in FIG. 1 rotated through 90° relative to FIG. 1.

DETAILED DESCRIPTION OF THE DRAWINGS

Figure 1:
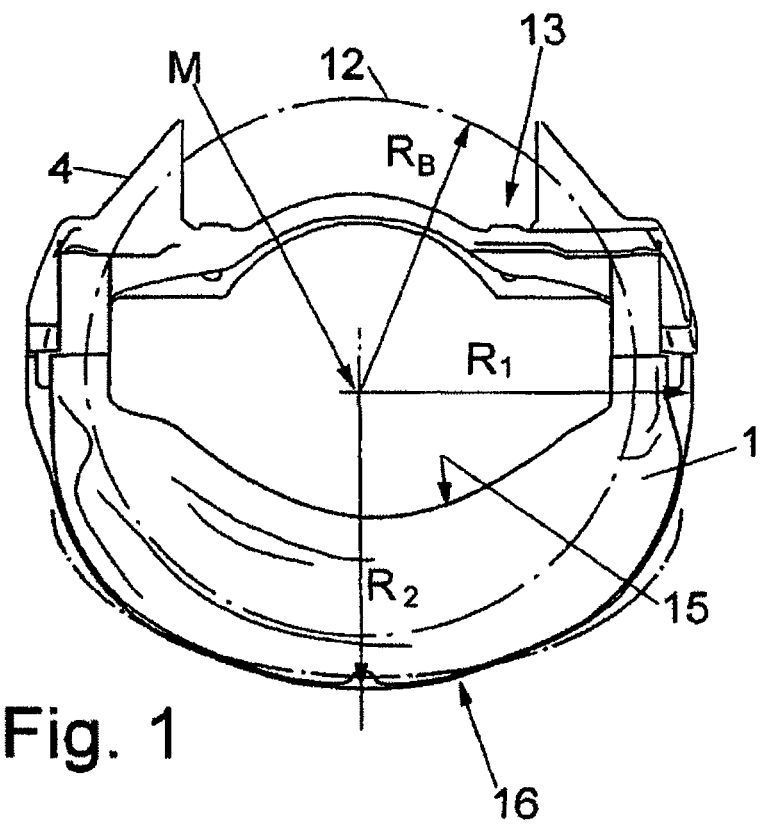
FIG. 1 is a side view of a brake disc cover disposed on a brake carrier.

FIG. 1 shows a brake disc cover 1 for a brake disc of a vehicle disc brake, of which only a brake carrier 4 is shown here. The brake disc is indicated only by the center line M thereof and by a dashed circle with the radius RB and the reference sign 12 in this figure. A brake caliper (not shown) of the disc brake is disposed on the brake carrier 4.

The brake disc cover 1 is preferably composed of two pieces comprising two cover parts 2, 3, which are connected, preferably welded, to each other, in particular sectionwise.

The disc brake caliper (not shown) is disposed on one component, which does not rotate with the wheel axle during travel, such as in this case, by way of example, the brake carrier 4. In contrast, the brake disc is coupled in a rotationally rigid manner to the rotating wheel axle. The component fixed to the axle also serves for the fixing of the brake disc cover 1.

Figure 4:
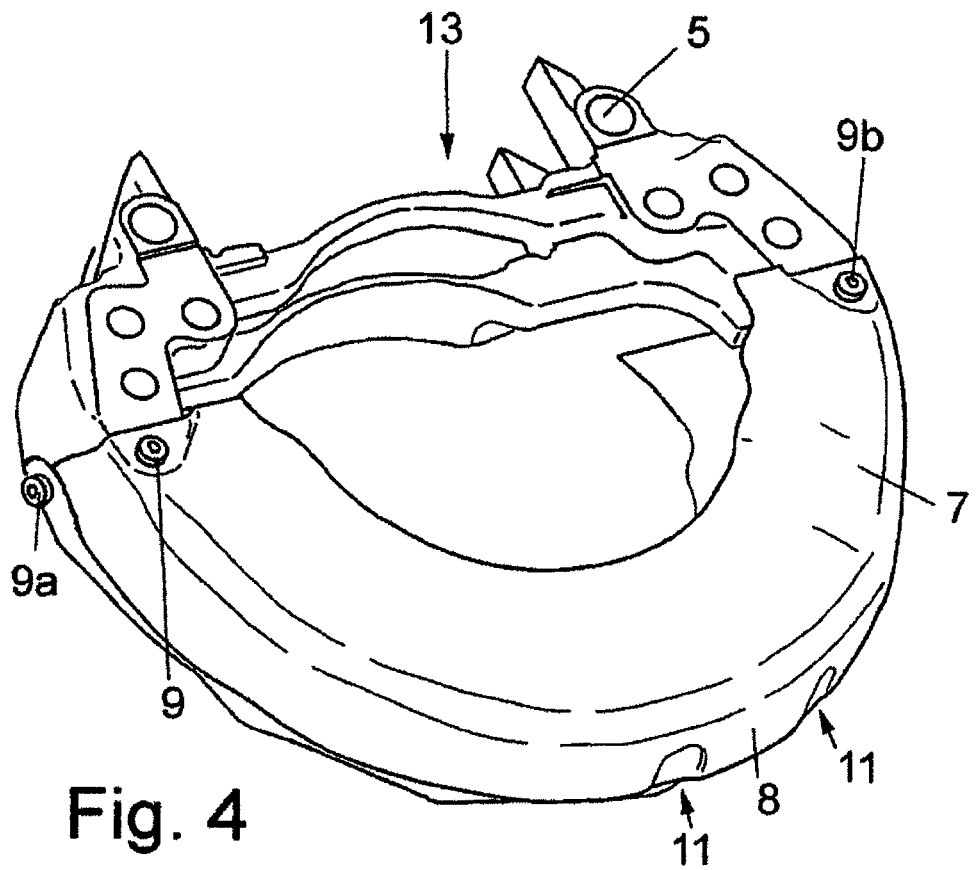
FIG. 4 is a perspective view of the arrangement in FIG. 1.

As shown in FIG. 4, the brake carrier 4 has fixing devices for fixing the disc brake, which here includes holes 5 for caliper bearing pins, which extend parallel to the brake disc axis and on which the caliper is disposed in a manner which allows it to slide.

The brake disc cover 1 is suitable to this extent for disc brakes of widely differing design, such as fixed caliper brakes, sliding caliper brakes or pivoting caliper brakes. Even if fixing on the brake carrier 4 is described below, this is to be understood merely as a particularly preferred embodiment and it should be generalized to cover fixing on a component fixed to the axle.

The brake disc 12 is preferably fixed on the vehicle axle in the axial direction. However, given appropriate dimensioning of the brake disc cover, it can also be designed as a sliding brake disc.

In order to protect the brake disc 12 from dirt and possibly from damage during operation, the brake disc cover 1 is fixed to the brake carrier 4, enclosing at least one or more sections of the peripheral edge of the brake disc in a trough-like fashion, in particular in a peripheral area which is not framed by the brake caliper.

The brake disc cover 1 has two side wall areas 6, 7, which cover a partial area of the axial sides of the brake disc, and a base wall area 8, which connects these lateral wall areas and covers the peripheral edge of the brake disc 12.

In the side view in FIG. 1, the side wall areas 6, 7 have an arc shape and with an inner peripheral edge situated closer to the center M of the brake disc 12 and an outer peripheral edge, extending beyond the outer peripheral edge of the brake disc. The generally radial extent of the side wall areas is at least sufficient to ensure that they completely or predominantly cover friction ring areas of the brake disc.

According to the preferred embodiment of the invention in FIG. 5, the side wall areas 6, 7 are not oriented parallel to each other but preferably at a slight angle such that the distance between these two side wall areas 6, 7 decreases radially from the inside outward. By means of a non-planar embodiment, it is also possible for the distance between the two side wall areas to increase locally while decreasing overall from the inner periphery of the brake disc cover to the outer periphery of the brake disc cover, it being possible, in particular, for respective straight sections angled relative to each other, each enclosing the brake disc cover on the outside, to be applied to the side wall areas. This tapering embodiment is preferably continuous over the entire section over which it covers the brake disc.

According to another advantageous embodiment, the brake disc cover 1 is connected in a special way, by means of fixing devices, to the component fixed to the axle, in particular the brake carrier, at least two, but preferably four, points. Screws are preferably used as fixing devices. As an alternative or supplementary measure, however, at least one clamping area, a rivet, a soldered area or a welded area is also contemplated as a fixing device.

Figure 3:
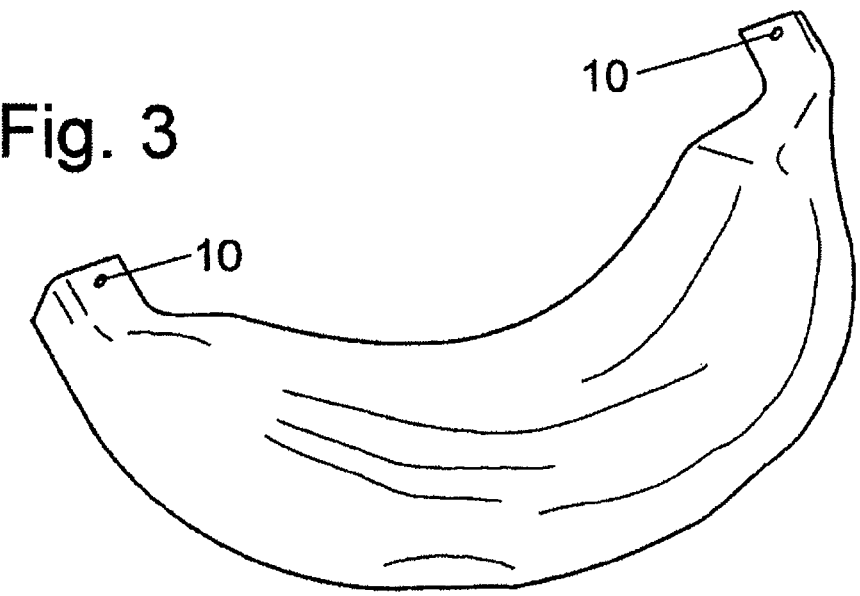
FIG. 3 is a perspective view of the brake disc cover in FIG. 1.

As shown in FIG. 4, fixing is preferably accomplished with the aid of screws 9, which pass through openings 10 (see FIG. 3) in the brake disc cover 1 and are screwed into corresponding threaded holes in the brake carrier 4. The fixing is preferably accomplished in each case by use of two of the screws 9 in two mutually remote areas of the brake carrier, preferably at the sides of a pad well 13 (see FIG. 1).

Fixing is preferably accomplished by use of two fixing devices, in particular screws 9a, 9b, oriented at an angle to each other, ensuring good fixing of the brake disc cover 1 in a simple manner and contributing to the reinforcement of the brake disc cover 1, which is preferably manufactured from a metal sheet or a composite material.

In this case, it is particularly preferred if in each case one of the two cover parts 2, 3 is fixed to the brake carrier—in each case relative to the brake disc axis—by at least one or more, in particular two, radially oriented screws 9a (preferably screwed radially from the outside inward) and the other cover part is fixed to the brake carrier by at least one or more, in particular two, axially oriented screws 9b. On the one hand, this allows easy assembly and, on the other hand, allows easy disassembly for servicing work.

Moreover, a kind of cage is particularly advantageously formed around the brake disc, the cage being self-supporting and having a particularly high natural frequency, i.e. the tendency for disadvantageous resonance effects during travel is reduced.

Particularly in the area of its outer periphery, it is particularly advantageous if the cover parts 2, 3 are also connected directly to each other, at least sectionwise, by a material bond and/or by positive and/or nonpositive engagement, in particular welded or adhesively bonded.

This inventive embodiment is particularly advantageous in respect of the other features of the invention, but is not compulsory. Thus, in respect of the further inventions, fixing with just axial screws is also contemplated, for example.

The brake disc covers are preferably modeled purely by means of free-form surfaces using a CAD model (e.g. with the aid of non-uniform rational B splines, see, for example, the entry of the same name in "Wikipedia" dated Apr. 14, 2008), giving their surface a geometry of a free-form surface type.

Modeling by means of free-form surfaces in the sense intended in this invention is to be understood to mean that the surface is not subject to continuous symmetry, and this likewise contributes to reinforcement and to a reduction in the tendency for vibration during driving.

Figure 2:
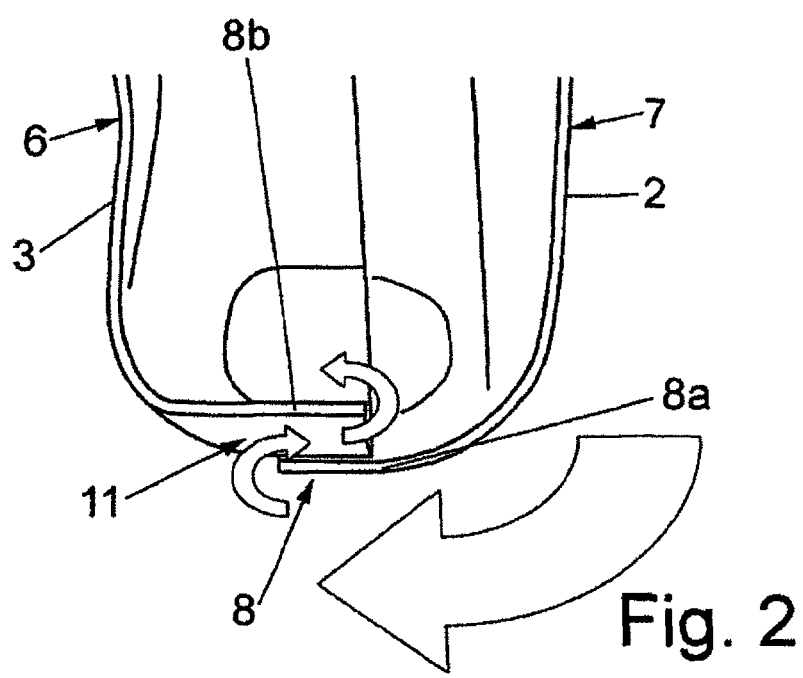
FIG. 2 is a sectional view through a partial area of the brake disc cover in FIG. 1.

As can be seen in FIG. 2, the spacing between these areas and the brake disc is therefore not constantly parallel and also not constantly angled, especially in the region of the axial side wall areas 6, 7. On the contrary, the brake disc cover 1 has a kind of curved shape bent in upon itself, but the side wall areas 6, 7 are at a sufficient distance from the brake disc surface at each point. In this way, particularly favorable vibration behavior is achieved.

It is advantageous if a kind of arcuate depression 14 bent around the center of the brake disc is formed in the brake disc cover in each of the side wall areas 6, 7 (Bézier function).

The parts 2, 3 of the brake disc cover 1, of which there are preferably two, are once again preferably punched out of a sheet metal blank and then bent to the contour of the brake disc cover parts by forming.

As an alternative, production from some other material, in particular from a composite material, is also contemplated.

Moreover, a one-piece embodiment is contemplated, and the two-piece embodiment illustrated is also possible.

The two-piece configuration offers the advantage of particularly simple production, the base wall area 8 then once again preferably having, at least sectionwise, two wall sections that overlap in this area.

In particular, the two-piece embodiment also offers the possibility of implementing at least one or more labyrinth arrangement(s) 11 in a simple manner by overlapping the two component parts 2, 3 forming the brake disc cover. This arrangement(s) on the one hand inhibiting the ingress of dirt and, on the other hand, allowing any dirt particles which have nevertheless reached the area of the brake disc to emerge. It is possible for a single labyrinth to be provided or, alternatively, a plurality of labyrinths spaced apart in the circumferential direction to be formed at the brake disc.

At least one labyrinth arrangement 11 is preferably formed in the base wall area 8 extending in parallel at the outside of the brake disc periphery, and is there once again preferably formed centrally, i.e. the base wall area 8 consists of two base wall sections 8a, 8b, overlapping sectionwise, which each tangentially adjoin the side wall areas 6, 7. The transition between the base wall sections 8a, 8b and the side wall areas 6, 7 is preferably continuous, in particular curved, not angular, and is furthermore preferably designed in the manner of a free-form surface.

The labyrinth 11 is preferably oriented in such a way that its radially outer opening is turned axially toward the inside of the vehicle after assembly.

The labyrinth arrangement 11 also ensures particularly good ventilation of the brake disc 12 for the purpose of cooling the latter. Stones and other relatively large particles can penetrate into the interior of the brake disc cover 1 only with difficulty, if at all.

The (dirt) labyrinth 11 may also have pocket-type holding areas for brake dust that is formed in order to be able to remove said dust more easily (not illustrated here).

Another outstanding special feature of the brake disc cover illustrated consists in the peripheral contour selected. On the inside (at 15) and the outside (at 16), the peripheral contour is preferably designed so as not to have the shape of a partial circle but to be flattened relative to the contour of a partial circle, at least over part of the peripheral extent.

Here, the maximum extent of the brake disc cover 1 is in the area of the screws that fit it to the brake carrier 4. In this area, the brake disc cover in each case has a radius R1.

Starting from these two areas, the radius of the outer periphery in each case decreases with increasing distance from the screw fixing areas. The radius R2 is smallest in the outer peripheral area, which is situated at the bottom in FIG. 1 and lies centrally between the screw fixing areas, i.e.

R2<R1.

The radius preferably does not decrease at a constant rate.

The peripheral contour is thus preferably of semi-elliptical or semi-oval flattened design, but it must have a larger peripheral radius at all points than the brake disc with the radius RB and the center M. This is a simple way of distributing the mass in an optimum fashion, the mass being placed closer to the center in certain areas than in an arrangement in which the outer periphery lies continuously on the circle with the radius R1.

Table of Reference Numerals

| | |
|---|---|
| brake disc cover | 1 |
| cover parts | 2, 3 |
| brake carrier | 4 |
| holes | 5 |
| side wall areas | 6, 7 |
| base wall area | 8 |
| base wall sections | 8a, 8b |
| screws | 9 |
| openings | 10 |
| dirt labyrinth | 11 |
| brake disc | 12 |
| pad well | 13 |
| depression | 14 |
| peripheral contour | 15, 16 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component of a disc brake having a brake disc with a peripheral edge, the component comprising:
   a brake disc cover for the brake disc, the brake disc cover being disposable on a vehicle component that is rotationally fixed during travel, the brake disc cover enclosing at least a section of the peripheral edge of the brake disc in a trough-like manner;
   wherein the brake disc cover includes:
      first and second side wall areas, each side wall area being arrangeable to cover at least a partial area of a respective axial side surface of the brake disc;
      a base wall area between the first and second side wall areas, the base wall area being arrangeable to cover the peripheral edge of the brake disc;
      wherein the first and second side wall areas are oriented at an angle with respect to one another such that a distance between the first and second side wall areas decreases in a radial direction from an inner peripheral edge of the brake disc cover toward an outer peripheral edge of the brake disc cover;
      at least one of an inner and outer radius of the brake disc cover has a maximum axial distance from the brake disk in an area wherein the brake disc cover is fixable to the component of the vehicle; and
      at least a portion of each sidewall adjacent to a friction ring area of the brake disc is curved in accordance with a Bézier function with at least one sidewall having an arcuate sidewall depression.

2. The component according to claim 1, wherein a surface contour of the brake disc cover is not mathematical symmetrical.

3. The component according to claim 2, wherein at least one of the first and second side wall areas has a non-planar concave surface curved inward toward the brake disk.

4. The component according to claim 1, wherein at least one of the inner and outer peripheral edges of the brake disc cover deviate at least in one or more sections from a partial circular shape.

5. The component according to claim 4, wherein the at least one of the inner and outer peripheral edges has a partially oval configuration.

6. The component according to claim 4, wherein the at least one of the inner and outer peripheral edges has a partially elliptical configuration.

7. The component according to claim 1, wherein the brake disc cover comprises a two- or more-part construction, and includes at least one labyrinth arrangement formed by overlapping wall sections, the labyrinth arrangement being operatively configured to provide ventilation for the brake disc.

8. The component according to claim 7, wherein the overlapping wall sections are in the base wall area.

9. The component according to claim 8, wherein two or more labyrinth arrangements formed by overlapping wall sections are provided in the base wall area.

10. The component according to claim 9, wherein the overlapping wall sections are connected to one other in peripheral areas of the brake disc cover between the labyrinth arrangements.

11. The component according to claim 1, further comprising a plurality of axially extending fixing devices, said axially extending fixing devices being configured to fix the brake disc cover to the component of the vehicle.

12. The component according to claim 1, further comprising fixing devices operatively oriented at an angle to one another, the fixing devices securing the brake disc cover to the component of the vehicle.

13. The component according to claim 12, wherein the angled fixing devices comprise at least one of screws, rivets and areas that are at least one of soldered, welded and clamped together.

14. The component according to claim 12, wherein the fixing devices are oriented at right angles to one another.

15. The component according to claim 1, further comprising at least one fixing device oriented radially and at least one fixing device oriented axially relative to an axis of the brake disc, said fixing devices securing the brake disc cover to the component of the vehicle.

16. The component according to claim 15, wherein the brake disc cover has a two-part construction, one of said parts being fixed to the component of the vehicle only by the radially oriented fixing device and the other part being fixed only by the axially oriented fixing device.

17. The component according to claim 16, wherein sections of the two-part construction of the brake disc cover are connected to one another.

18. The component according to claim 1, further comprising countersunk head screws operatively arranged to fix the brake disc cover to the component of the vehicle.

* * * * *